Feb. 7, 1967     J. D. FLEXON ETAL     3,302,352
GLASS FURNACE BOTTOM WALL CONSTRUCTION
Original Filed June 19, 1962     3 Sheets-Sheet 1
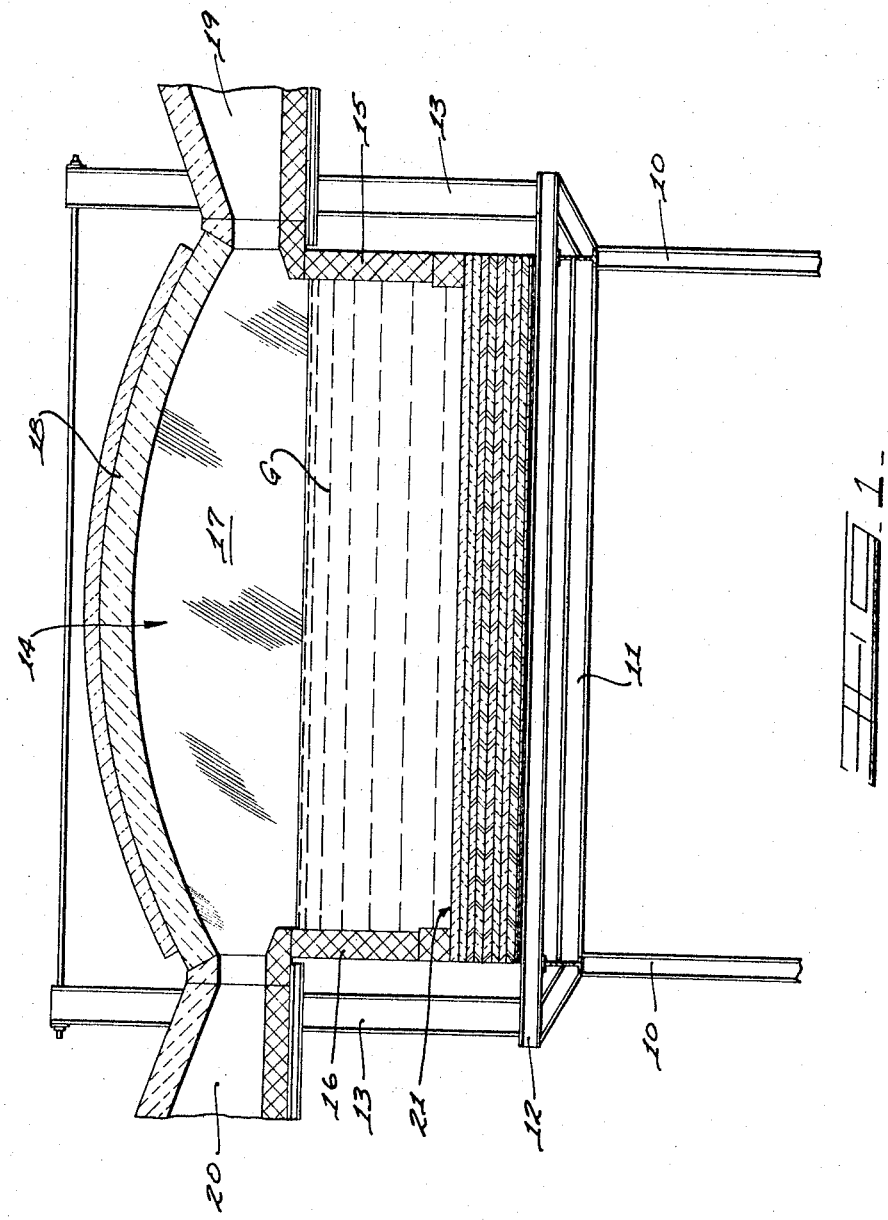
INVENTORS
JOHN D. FLEXON &
BY NORMAN E. FRISK
J. R. Nelson and
W. A. Schaich
ATTORNEYS Feb. 7, 1967         J. D. FLEXON ETAL         3,302,352
           GLASS FURNACE BOTTOM WALL CONSTRUCTION
Original Filed June 19, 1962                3 Sheets-Sheet 2
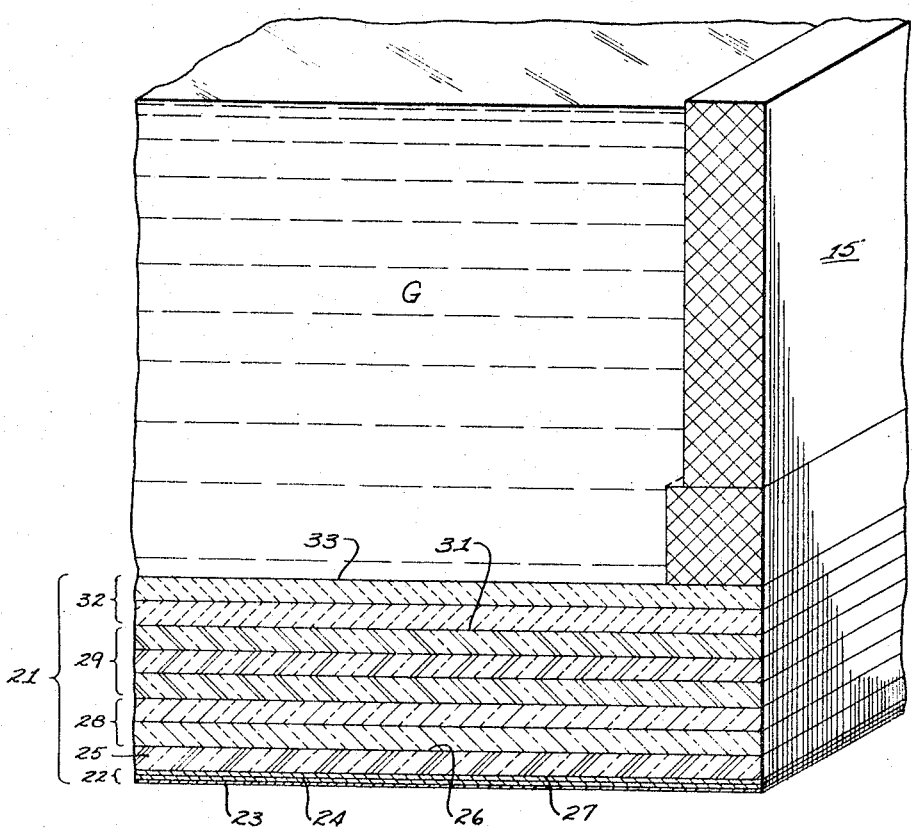
REFRACTORY
LEGEND
FUSION CAST, Al-Zr-Si
PRESSED ZIRCON
SUPER DUTY FIREBRICK
HIGH GRADE FIREBRICK
INSULATING FIREBRICK
INVENTORS
JOHN D. FLEXON &
BY NORMAN E. FRISK
J. R. Nelson, and
W. A. Schaich
ATTORNEYS

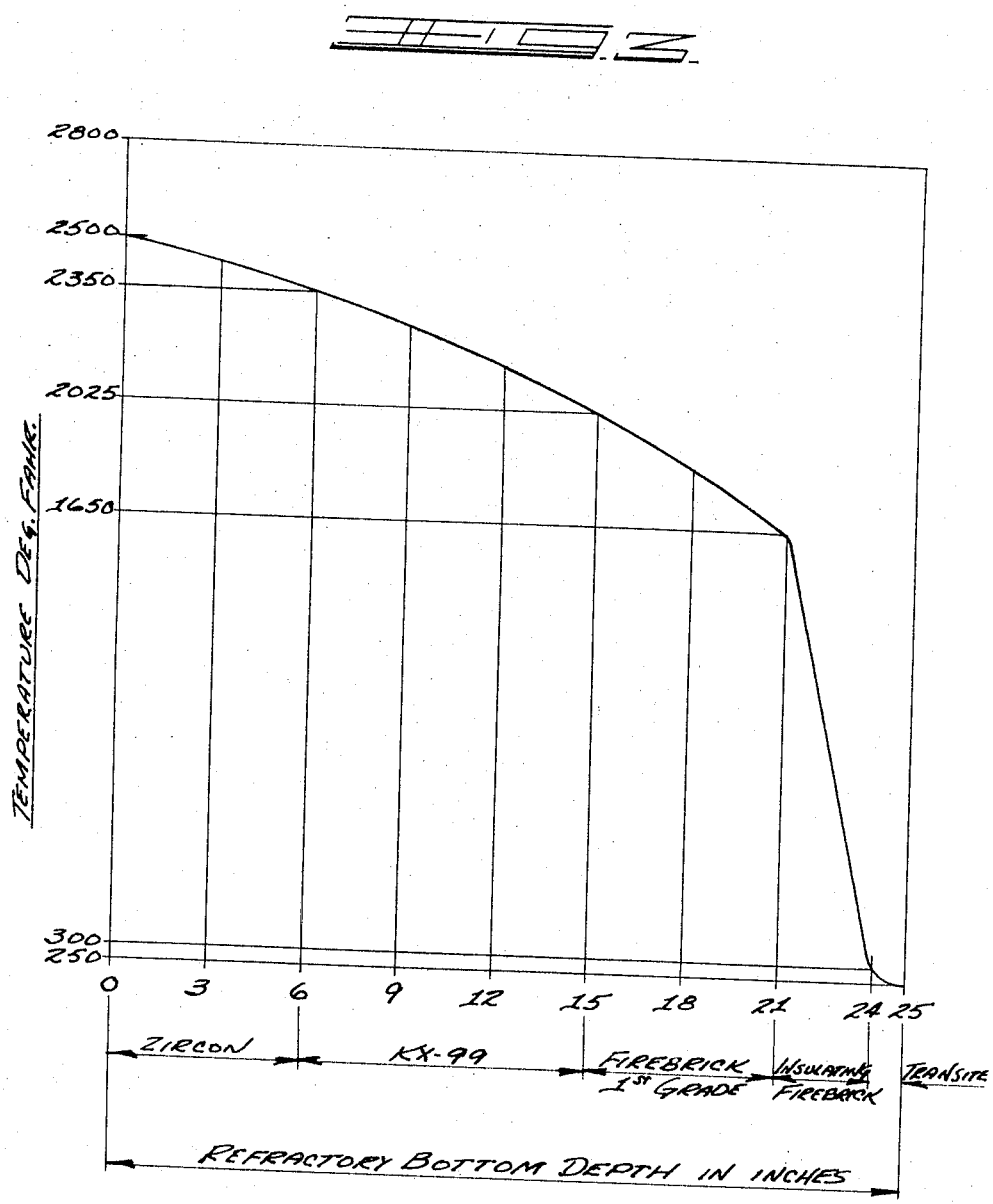

United States Patent Office 3,302,352
Patented Feb. 7, 1967

3,302,352
GLASS FURNACE BOTTOM WALL
CONSTRUCTION
John D. Flexon, Leblo, Rio de Janeiro, Brazil, and Norman E. Frisk, Toledo, Ohio, assignors to Owens-Illinois, Inc., a corporation of Ohio
Continuation of application Ser. No. 203,662, June 19, 1962. This application Mar. 18, 1966, Ser. No. 535,575
5 Claims. (Cl. 52—408)

This is a continuation of my earlier copending application, Serial No. 203,662, filed June 19, 1962, now abandoned.

The present invention relates to improved bottom wall construction in a glass furnace with reduced heat loss.

Basically, the invention has as one object the provision of an improved insulated glass furnace bottom wall structure. More specifically, the invention has a further object of providing such an insulated furnace bottom wall which has a good wear resistant glass contacting surface made of a layer of a refractory material selected for its physical properties predominantly as a long wearing surface, an underlying layer of a refractory material selected for its physical properties to withstand glass contact, yet provide good insulation, this layer serving as a secondary insulating layer or temperature barrier against heat loss, and a layer underlying that of a refractory material selected for its insulating properties, this layer serving as the main heat barrier or major insulation. The layers of refractories are laid in blocks or bricks and mortared together.

More specifically, the invention has as another object the provision of a bottom wall construction of a glass furnace using various layers constructed of refractory block or brick that are selected for their glass corrosion resistance at various temperatures encountered in the glass making process, plus providing a refractory heat barrier.

Another object of the invention is to provide an improved glass furnace bottom structure of multiple layers or courses of selected refractory block or brick having dissimilar properties so that the bottom structure presents a good glass contacting surface, and underlying this surface is a refractory having selected physical properties and glass contact properties so as to establish interface temperature between the layers or courses that is below the liquidus temperature of the glass in the furnace.

An additional object of the invention, in conjunction with the foregoing is to provide for a reduced temperature at the outside face of the bottom wall of a glass furnace and reduce the heat loss through the furnace bottom wall.

The specific nature of this invention, as well as other objects and advantages thereof, will become apparent to those skilled in the art from the following detailed description, taken in conjunction with the annexed sheets of drawings, on which, by way of preferred example only, are illustrated two embodiments of this invention.

In the drawings:

FIG. 1 is a partial, lateral, sectional elevational view of the glass melting compartment of a regenerative, side port glass melting furnace, including the improved bottom wall construction of the invention;

FIG. 2 is an enlarged, sectional, fragmentary view of the juncture of the bottom and side walls of the furnace structure of FIG. 1, which shows in greater detail the improved bottom wall structure of the present invention; and FIG. 3 is a graph of the temperature gradient through the bottom wall construction of the present invention in an operating glass melting furnace.

Referring to FIG. 1, the general arrangement of a side port, gas fired, regenerative glass melting furnace is shown. The furnace includes supporting substructure as the vertical steel supports 10 and the horizontal superimposed beams 11 and 12. The beams 12 support vertical I-beams 13. On this framework is constructed the melting compartment, referred to generally as 14, which is defined by opposite side walls 15 and 16, an end wall 17 (details of which are not shown), and an arched roof or crown 18. The crown includes an outer insulation 18'. Along the side walls are regenerator ports 19 and 20 through which a combustible fuel-air mixture is introduced and products of combustion in the form of gases are exhausted, alternately, during reversed firing cycles. The side ports are connected to regenerator chambers (not shown). The foregoing provides one exemplary setting for the invention in the known side-port, regenerative glass furnace. There are many other known types of glass furnace constructions to which the invention will apply equally.

Supported on the lateral beams 12 is the improved bottom wall structure of the invention, said wall being referred to generally at 21. The bottom wall is constructed of multiple layers of refractory materials. Next to the support beams 12 is a lower casing 22 which, in preferred form, comprises a metal sheeet 23 which forms the outer face or surface of the bottom wall 21. This metal sheet may be of steel mesh, expanded metal or steel plate, to name but a few examples. Overlying sheet 23 are two courses or layers of a cement-asbestos sheet material or similar asbestos bearing sheet material 24. Examples of this are "Transite" and "Asbestocite," which are sold by Johns-Manville Company. This lower casing 22 forms a support structure for the overlying brick layer, to be next described, and retains the brick in place. This casing at sheet 23 forms the outer surface of the furnace bottom wall that is exposed to the atmosphere, except of course, where it is in supported contact on the top of beams 12.

Next, a layer of insulating firebrick 25 is laid on the top of the lower casing 22. This constitutes the main heat barrier in the bottom wall construction and serves to provide the major insulation for heat loss through the bottom wall. It is one of the most essential elements in the combination of the construction of the improved bottom wall structure of this invention. Its ratio of thickness to the total thickness of the bottom wall should be at least about 1:8. This insulating firebrick has the general properties of (ASTM standard specifications):

(1) A reheat change of not more than 2% when tested at 2250° F. [ASTM C155-57].
(2) A bulk density not greater than 48 pounds per cubic foot [ASTM C155-57].

Of this class of insulating firebrick, it is preferred that one be selected having the added physical property of a low thermal conductivity, e.g. approximately 2 B.t.u. per square foot per inch of thickness per hour, per ° F. at 2000° F. An example of such a refractory material is sold by Babcock and Wilcox Company under the name of B & W, K-23 Insulating Firebrick. This class of material, i.e. insulating firebrick, is capable of presenting a heat barrier with a temperature gradient from approximately 1700° F. at its inner face 26 to approximately 350° F. at its outer face 27 adjacent the lower casing 22. In the preferred example, illustrated herein, the layer 25 is approximately 3" thick.

Laid over the insulating firebrick 25 along the inner face 26 is a secondary heat barrier or insulating layer 28 which is constructed of a refractory that not only has a good insulating property, but will withstand molten glass contact. This layer 28 is comprised of courses of firebrick. For purposes of economy of construction it is preferred this layer 28 be made up of two courses of a High Duty firebrick. High Duty is an ASTM designation for a firebrick that has a minimum P.C.E. (Pyrometric Cone Equivalent) of 31.5 [ASTM C–27–56]. This is sometimes referred to in the industry as "First Grade" firebrick. Superimposed over the High Duty brick 28 are three courses of Super Duty firebrick 29. Super Duty is an ASTM designation for a firebrick that has a minimum P.C.E. (Pyrometric Cone Equivalent) of 33 [ASTM C27–60]. The High Duty firebrick layer 28 possesses the satisfactory insulating properties, whereas the Super Duty layer 29 additionally provides properties necessary to withstand molten glass contact. In the arrangement described the material selected for layer 28 may be of the less expensive firebrick. If expense is of no concern, both layers 28 and 29 may be of the more expensive Super Duty firebrick, described above. In the preferred example illustrated, the layer 28 is comprised of two courses of 3″ thick brick. The layer 29 is comprised of three courses of 3″ thick brick. The Super Duty brick is provided as a safety precaution. In the event the overlying refractory layer 32 is worn away, the molten glass will penetrate to the interface 31. This Super Duty firebrick will withstand molten glass contact.

The layer 29 forms an interface 31 with the overlying layer 32. Layer 32 provides the glass contacting surface 33 of the furnace bottom wall and directly supports the pool of molten glass G in the melter. The layer 32 is constructed of a wear resistant refractory, examples of which are pressed zircon; or fusion cast or bonded refractory materials. Examples of these materials are FC101 sold by Walsh Refractories Co., ZAC sold by Corhart Manufacturing Company, and Monofrax M and Monofrax S both sold by Harbison-Carborundum Company. Fusion cast refractories are composed of oxides of Al-Zr-Si or fused alumina. A single course of 3″ thick refractory block of this type will be expected, under normal circumstances, to resist corrosion and wear of the abrasive molten glass G for a furnace operating campaign of about three years. If the furnace campaign is to be extended beyond this period, a second 3″ course of the pressed zircon is provided. This will extend the life or wear resistance of the glass contacting surface upwards of three additional years, and so on. In other words, the abrasive and corrosion action of the glass on the glass contacting surface 33 erodes the material of the layer 32 and wears or washes it away. This erosion will be expected to be about 3″ of depth of the refractory in three years of time.

Referring now to FIG. 3, the temperature characteristics of the improved bottom wall construction of the invention is shown in a graph plotting temperature against bottom wall depth, taking into account a preferred example of materials and construction of the furnace bottom wall, as described herein.

This preferred furnace bottom of the invention is constructed as follows:

Layer 32: Six inch thickness of pressed zircon refractory.
Layer 29: Nine inch thickness of KX–99 Super Duty firebrick.
Layer 28: Six inch thickness of High Duty firebrick.
Layer 25: Three inch thickness of K–2300 Insulating firebrick.

This construction was designed for a flint glass melting operation wherein the glass surface temperature was 2800° F. and a depth of the glass body of about 60″, and a glass temperature at the surface 33 of the bottom wall, of about 2500° F. The data reported below represents calculated temperatures based on the known temperature characteristics of the materials disclosed. These temperatures, as shown in the following example, are plotted on the graph of FIG. 3 to illustrate an improved temperature gradient and reduced heat loss of the wall construction of the present invention.

*Example*

| Material | Thickness, in. | Inner Face Temp., °F. | Outer Face Temp., °F. | Average Temp., °F. | Total Heat Loss, B.t.u./ft.²/hr. |
| --- | --- | --- | --- | --- | --- |
| Zircon | 6 | 2,500 | 2,350 | 2,425 | |
| KX 99 | 9 | 2,350 | 2,025 | 2,188 | |
| 1st Grade | 6 | 2,025 | 1,650 | 1,838 | 470 |
| K 2300 | 3 | 1,650 | 300 | 975 | |
| Transite | 1 | 300 | 250 | 275 | |

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:
1. A bottom wall construction for a glass melting furnace comprising, in combination: an uninterrupted molten-glass contacting layer of abrasion resistant zircon bricks; a plurality of superimposed uninterrupted layers of firebricks of first quality underlying and supporting said layer of zircon bricks, said firebricks of first quality having a pyrometric cone equivalent of at least 33 and having the ability to withstand contact with molten glass for prolonged periods without loss of useful properties; a plurality of superimposed layers of firebricks of a second quality underlying and supporting said firebricks of a first quality, said firebricks of a second quality having a pyrometric cone equivalent of at least 31.5 and less than that of said firebricks of first quality, having no substantial ability to withstand contact with molten glass for prolonged periods, and having a coefficient of thermal conductivity which is less than the coefficient of thermal conductivity of the firebricks of first quality; a layer of insulating firebricks underlying and supporting said layers of firebricks of second quality, said insulating firebricks having a reheat change of not more than 2% at 2250° F., a bulk density of not more than 48 pounds per cubic foot, and a coefficient of thermal conductivity at 2000° F. of the order of 2 B.t.u. per square foot per inch of thickness per hour; and metallic supporting structure underlying and supporting said layer of insulating firebricks, a layer of an asbestos-bearing sheet material underlying said layer of insulating firebricks and supported directly on said metallic supporting structure.

2. A bottom wall construction in accordance with claim 1, wherein said asbestos-bearing sheet material comprises a thin layer of cement-asbestos sheet material.

3. A bottom wall construction in accordance with claim 1, comprising three layers of three-inch deep firebricks of first qulity, two layers of three-inch deep firebricks of second quality, and one layer of three-inch deep insulating firebricks.

4. A bottom wall construction in accordance with claim 3 and comprising two superimposed uninterrupted layers of three inch deep zircon bricks, the upper layer being supported directly on the lower layer.

5. A bottom wall construction in accordance with claim 2 comprising three layers of three-inch deep firebricks of first quality, two layers of three-inch deep firebricks of second quality, one layer of three-inch deep insulating firebricks, and comprising two courses of said cement-asbestos sheet material underlying the said layer of insulating firebricks and supported on a layer of expanded metal.

References Cited by the Examiner

UNITED STATES PATENTS

| | | | |
|---|---|---|---|
| 2,293,089 | 8/1942 | Wainer | 52—612 |
| 2,916,535 | 12/1959 | Marden | 263—46 |
| 3,048,481 | 8/1962 | Eastman | 266—43 X |

OTHER REFERENCES

Taylor Zircon Refractories for High Temperature Service and Special Applications, published by Chas. Taylor Sons Co. of Cincinnati, Ohio, pages 2, 3, 6, 8, and 9. (Copy received December 1949.)

FRANK L. ABBOTT, *Primary Examiner.*

J. E. MURTAGH, *Assistant Examiner.*